United States Patent

Katsuyama et al.

Patent Number: 5,460,341
Date of Patent: Oct. 24, 1995

[54] DISTURBANCE COMPENSATION SYSTEM FOR A CAMERA ON BOARD A SPACECRAFT

[75] Inventors: Yoshihiko Katsuyama; Akinori Sato; Naoki Takizawa, all of Tokyo, Japan

[73] Assignee: NEC Corporation, Japan

[21] Appl. No.: 98,962

[22] Filed: Jul. 28, 1993

[30] Foreign Application Priority Data

Jul. 29, 1992 [JP] Japan ..................... 4-222079

[51] Int. Cl.⁶ ................ B64G 1/22; H04N 5/228
[52] U.S. Cl. ............ 244/118.1; 348/117; 348/208; 244/158 R
[58] Field of Search ................ 244/1 R, 158 R, 244/129.1, 118.1; 348/208, 117

[56] References Cited

U.S. PATENT DOCUMENTS 3,518,372  6/1970  Johns ...................... 348/208
3,619,500  11/1971 Bauley et al. .............. 348/208
4,774,589  9/1988  Rowland .................... 348/208
5,294,991  3/1994  Oshima et al. ............. 348/208

Primary Examiner—Galen L. Barefoot
Attorney, Agent, or Firm—Ostrolenk, Faber, Gerb & Soffen

[57] ABSTRACT

A disturbance compensation system for a camera on board a spacecraft and having an imaging device and condensing means for condensing light onto the imaging device. Linear actuators adjust the position of the imaging device by moving it with multifreedom. A control circuit computes, in response to position information associated with the imaging device, an amount in which the position of the imaging device should be corrected, and controls the linear actuators on the basis of the computed amount.

3 Claims, 5 Drawing Sheets

DISTURBANCE COMPENSATION SYSTEM FOR A CAMERA ON BOARD A SPACECRAFT

BACKGROUND OF THE INVENTION

The present invention relates to a camera, or imaging apparatus, on board a satellite or similar spacecraft and having an imaging device and condensing means. More particularly, the present invention is concerned with a disturbance compensation system capable of correcting, on board, the optical axis displacements due to the attitude changes of the spacecraft on the orbit, vibrations due to movable parts included in the camera, and other disturbances, the focus displacements of the condensing means due to temperature changes, the fine position displacements of the imaging device due to positioning errors particular to a production line and vibrations ascribable to launching, etc.

Generally, an on-board camera for a satellite or similar spacecraft and having an imaging device and condensing means suffers from positioning errors particular to a production line, fine position displacements of the imaging device due to launching, misregistration of images due to vibrations ascribable to changes in attitude on the orbit and the operations of movable parts, relative misregistration of images between bands in the case of multiband optics (interband registration). To correct such displacements and misregistrations, it is a common practice to send data from the spacecraft to the ground stations and process images by software at the base station or, in the case of on-board correction, to change the angular position of a mirror located in front of the condensing means. However, the software scheme needs the development of special programs and requires manual operations for image processing, resulting in time- and labor-consuming work. As a result, real-time correction is not available with this kind of scheme. Furthermore, such image processing cannot correct the displacements of the focal position. Although the mirror scheme is capable of correcting the orientation of the optical axis by real-time processing, it cannot correct, in the case of multiband optics, the misregistration between bands. Another problem with the mirror scheme is that the diameter of the mirror depends on an aperture diameter of an optical condensing means. Therefore, the more the optical condensing means is large, the more an appearance and mass of the mirror and a mirror drive mechanism. As a result of the problem, it is difficult for the mirror scheme to be applicated as the system to spacecraft on board equipment which should be light weight and consume a minimum of power. In addition, rapid response is not achievable due to the heavy mirror.

SUMMARY OF THE INVENTION

It is therefore an object of the present invention to provide a disturbance compensation system for an on-board spacecraft camera which can correct, on the spacecraft, orientation displacements of an optical axis, focus displacements of condensing means, fine positional displacements of an imaging device, etc.

It is another object of the present invention to provide a disturbance compensation system capable of correcting, on a spacecraft, the misregistration between the bands of multiband optics.

It is a further object of the present invention to provide a disturbance compensation system having a miniature configuration with no regard to the size of condensing means.

In accordance with the present invention, a disturbance compensation system for a camera on board a spacecraft and having an imaging device and condensing means for condensing light onto the imaging device comprises linear actuators for adjusting the position of the imaging device by moving it with multifreedom. A control circuit computes, in response to position information associated with the imaging device, an amount in which the position of the imaging device should be corrected, and controls the linear actuators on the basis of the computed amount.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

Figure 1:
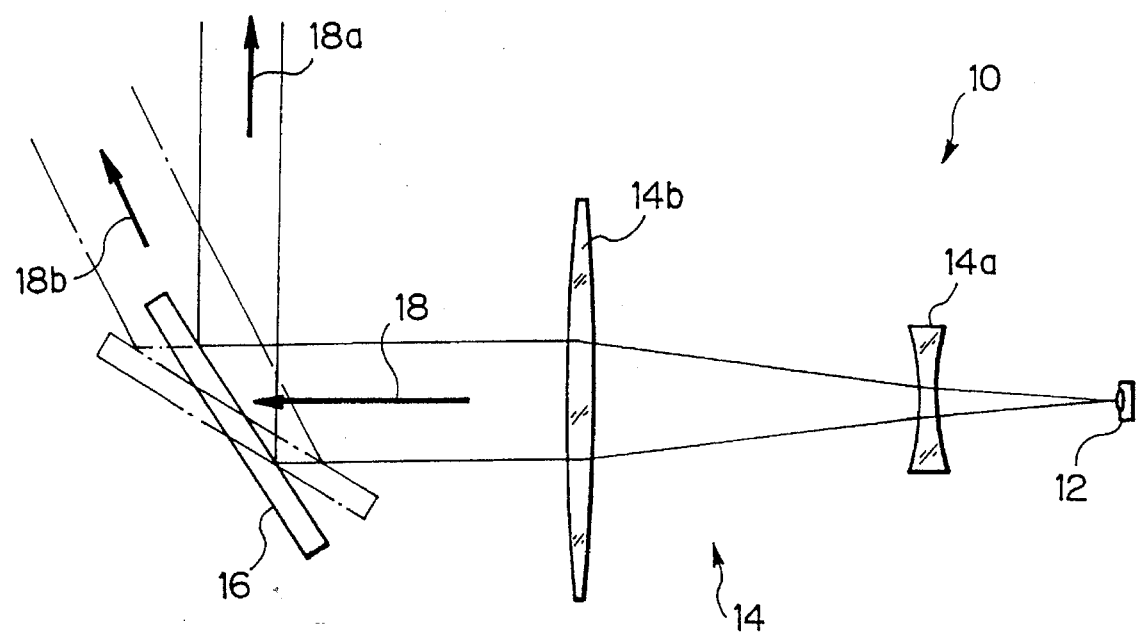
FIG. 1 is a fragmentary view of a conventional disturbance compensation system for an on-board camera of a spacecraft.

To better understand the present invention, a brief reference will be made to a prior art disturbance compensation system for an on-board spacecraft camera, shown in FIG. 1. As shown, the system, generally 10, has an imaging device 12, a condensing device 14 made up of two lenses 14a and 14b and having an optical axis 18, and a mirror or reflector 16 located in front of the condensing device 14. The angular position of the mirror 16 relative to the optical axis 18 is variable to correct the orientation of the optical axis 18, as represented by an arrow 18a or 18b. The system 10 can correct the orientation of the optical axis 18 by real time processing. However, the system 10 cannot correct disturbances due to rotation about the axis 18, focus deviations, interband misregistration in the case of multiband optics, etc. Another problem with the mirror scheme is that the diameter of the mirror 16 depends on an aperture diameter of an optical condensing means. Therefore, the more the optical condensing means is large, the more an appearance and mass of the mirror 16 and a mirror drive mechanism. As a result of the problem, it is difficult for the mirror scheme to be applicated as the system 10 to spacecraft on board equipment which should be light weight and consume a minimum of power. In addition, rapid response is not achievable due to the heavy mirror 16.

Figure 2:
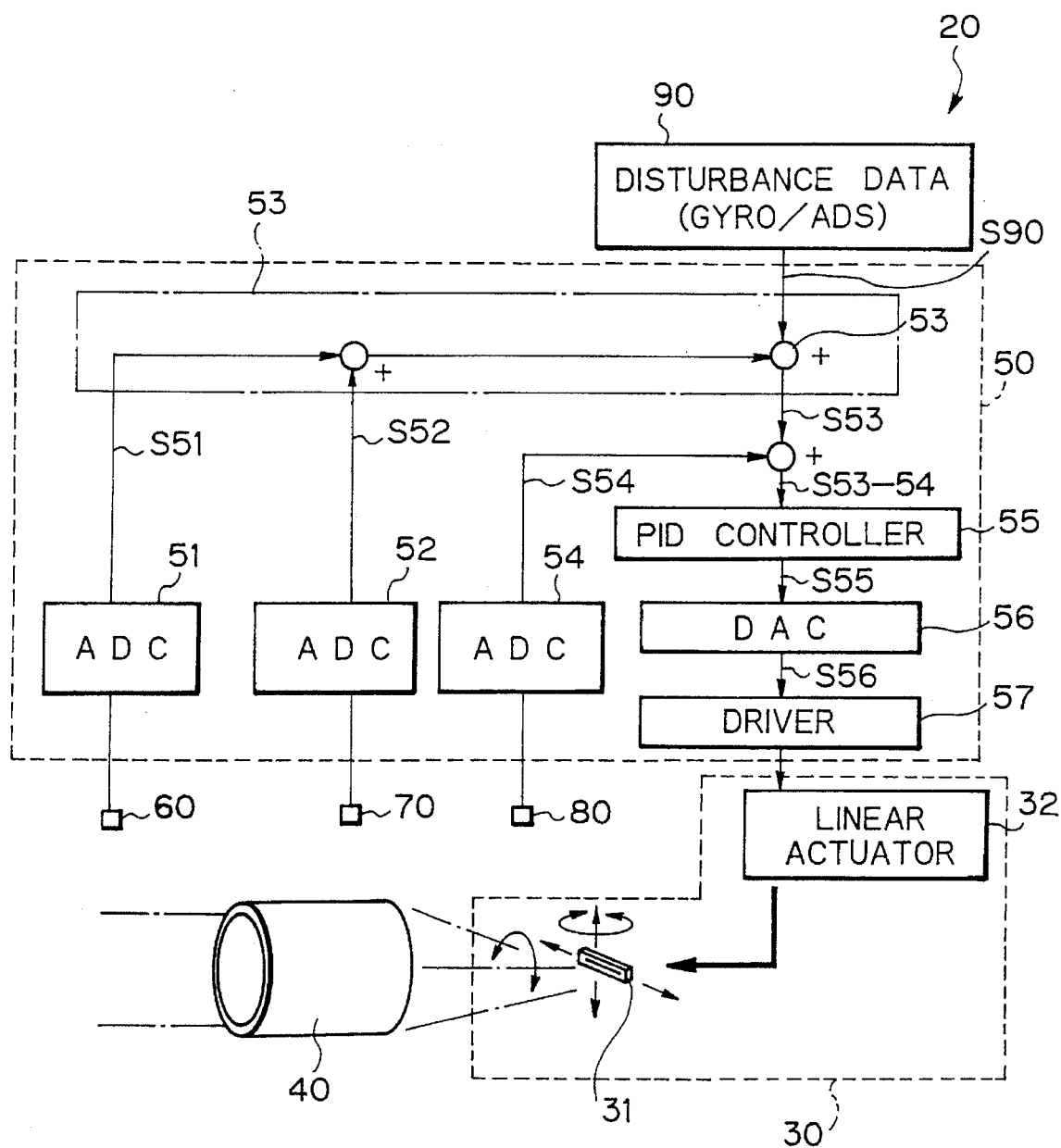
FIG. 2 is a block diagram schematically showing a disturbance compensation system embodying the present invention.

Referring to FIG. 2, a system embodying the present invention is shown and generally designated by the reference numeral 20. As shown, the system 20 is generally made up of a section 30 for adjusting the position of an imaging device 31, condensing means 40, a control and computation section 50, a displacement sensor 60, a temperature sensor 70, and a sensor 80 responsive to the position of the imaging device 31. To drive the system 20, there is required data 90 associated with disturbances, e.g., the current attitude of the spacecraft relative to the ground or similar target and the vibrations of the spacecraft. The position adjusting section 30 has a linear actuator 32 for driving the imaging device 31. The displacement sensor 60 monitors the positions of optical parts constituting the condensing means 40. The temperature sensor 70 monitors the temperatures of various sections included in the condensing means 40. Further, the position sensor 80 senses the multifreedom position of the imaging device 31.

The control and computation section 50 has an analog-to-digital converter (ADC) 51 for converting the analog output of the displacement sensor 60 to a digital signal S51. An ADC 52 transforms the analog output of the temperature sensor 70 to a digital signal S52. A computing circuit 53 adds digital signals, which are converted to the focal plane error based on the digital signals S51 and S52, to a signal S90 from the disturbance data 90 so as to produce a signal S53 representative of an optimal target position. An ADC 54 converts the analog output of the position sensor 80 to a digital signal S54. A PID controller 55 executes subtraction with the signal S53 representative of the optimal target position and the output S54 of the ADC 54. The resulting error signal S53–S54 is used to effect PID control. A digital-to-analog converter (DAC) 56 transforms the digital output S55 of the PID controller 55 to a digital signal S56. A driver 57 drives the linear actuator 32 in response to the output S56 of the DAC 56.

Figure 3:
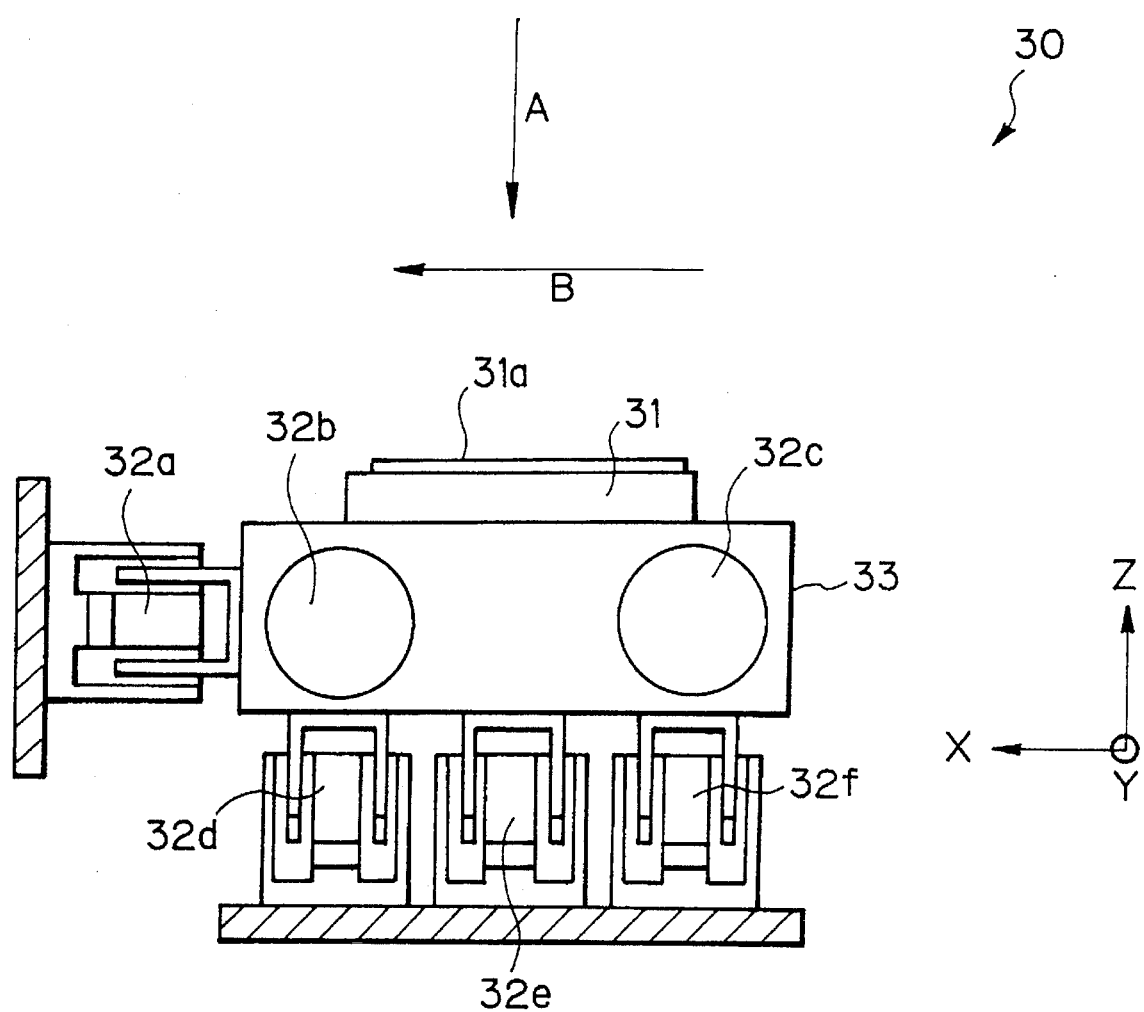
FIG. 3 is a view of a section included in the embodiment for adjusting the position of an imaging device.

FIG. 3 shows the position adjusting section 30 specifically. As shown, the imaging device 31 is mounted on a base 33. In the figure, an arrow A indicates the optical axis of light incident to the imaging device 31. Also mounted on the base 33 are linear actuators 32a, 32b, 32c, 32d, 32e and 32f. The linear actuator 32a moves the imaging surface 31a of the imaging device 31 along an X axis parallel to the surface 31a. The linear actuators 32b and 32c cooperate to move the imaging surface 31a along a Y axis which is parallel to the surface 31a and perpendicular to the X axis. The linear actuators 32d, 32e and 32f move the imaging surface 31a along a Z axis which is perpendicular to the surface 31a and perpendicular to the X and Y axes. The linear actuators 32d, 32e and 32f are so positioned as not to align at the position where they contact the base 33.

Figure 4:
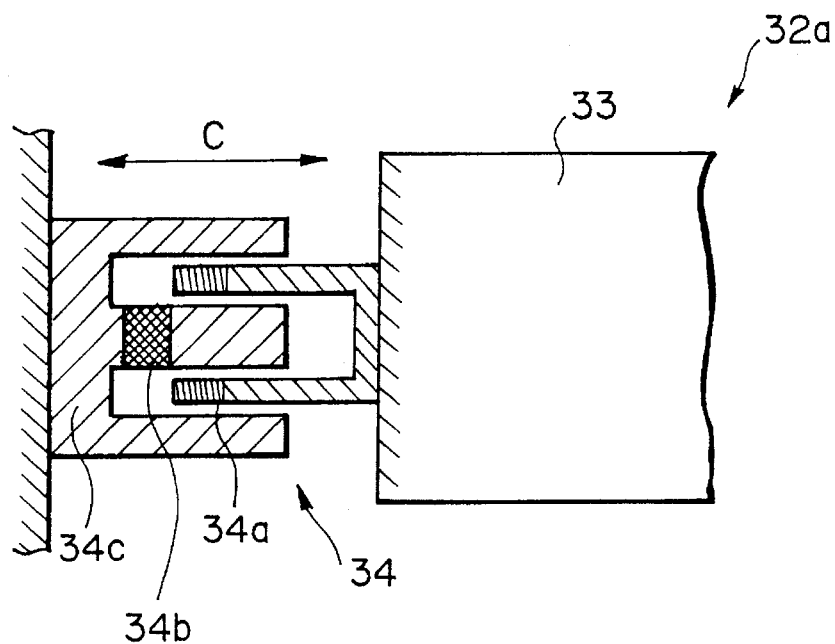
FIGS. 4 and 5 are sections each showing a specific construction of a linear actuator included in the section of FIG. 3.
Figure 5:
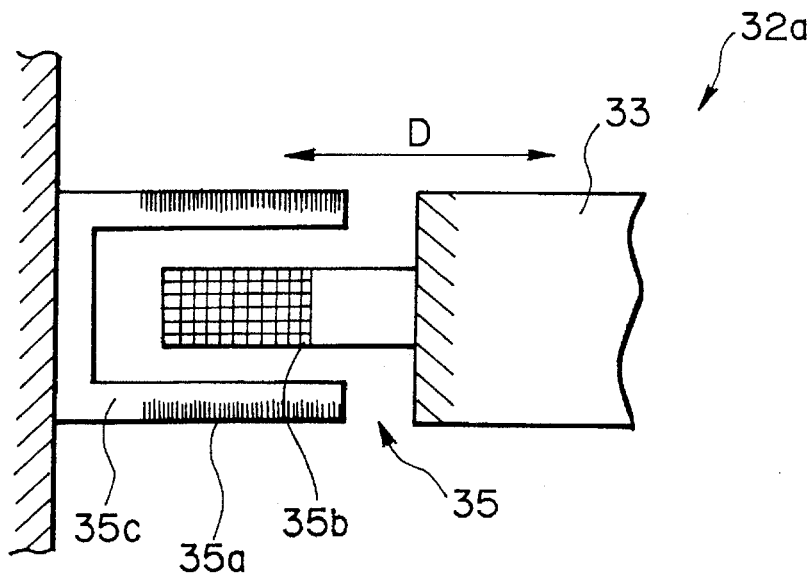

FIGS. 4 and 5 each shows a specific construction of the linear actuators 32a–32f. Let the following description concentrate on the linear actuator 32a by way of example. In FIG. 4, the linear actuator 32a is implemented by a voice coil motor 34 while, in FIG. 5, it is implemented by a moving magnet 35. Referring to FIG. 4, the voice coil motor 34 has a coil 34a affixed to the base 33. When a voltage is applied to the coil 34a, the coil 34a moves in a direction C without contacting a yoke 34c due to the force of a permanent magnet 34b adjoining the yoke 34c. Whether the coil 34a moves toward the yoke 34c or away therefrom in the direction C depends on the polarity of the voltage applied to the coil 34a. In FIG. 5, the moving magnet 35 has a coil 35a, a permanent magnet 35b affixed to the base 33, and a stationary yoke 35c. When a voltage is applied to the coil 35a, a force acts on the yoke 35c due to the force of the permanent magnet 35b. As a result, a reaction acts on the magnet 35a since the yoke 35c is stationary. The reaction causes the base 33 to move in a direction D without contacting the yoke 35c. Again, whether the magnet 35b moves toward the yoke 35c or away therefrom in the direction D depends on the polarity of the voltage applied to the coil 35a.

The operation of the system 20 will be described hereinafter. The displacement sensor 60 and temperature sensor 70 each senses the condition of respective section associated with the condensing means 40. A relation between the outputs of the sensors 60 and 70 and the angular displacements of the optical axis, focus displacements of the condensing means 40 and so forth is determined beforehand by design computation or by tests on the ground. On the orbit, the analog outputs of the sensors 60 and 70 are converted to digital signals S51 and S52 by the ADCs 51 and 52, respectively. A computing circuit 53 adds digital signals, which are converted to the focal plane error based on the digital signals S51 and S52, to a signal S90 from the disturbance data 90 so as to produce a signal S53 representative of an optimal target position.

On the other hand, the analog output of the position sensor 80 responsive to the position of the imaging device 31 is converted to a digital signal S54 by the ADC 54 and then compared with the output S53 of the computing circuit 53. A signal S53–S54 representative of the result of comparison is fed to the PID controller 55. During PID feedback control, the PID controller 55 computes parameters for moving the imaging device 31 to the optimal target position. These parameters are delivered to the driver 57 via the DAC 56 as an analog signal S56. In response, the driver 57 applies an adequate voltage to the linear actuator 32.

Referring to FIG. 3, the liner actuator 32a and the linear actuators 32b and 32c control the rotation of the base 33 and imaging device 31 about the Z axis based on their power balance, while respectively controlling the position in the direction X and the position in the direction Y, as stated earlier. Likewise, the linear actuators 32d–32f control the rotation of the base 33 and imaging device 31 about the X and Y axes while controlling the position in the direction Z. By controlling such six linear actuators 32a–32f, it is possible to control the imaging device 31 with respect to six different motions, i.e., the movement along the X, Y and Z axes and the rotation about the X, Y and Z axes. Specifically, the control over the rotation of the imaging device 31 brings the imaging surface 31a of the device 31 to a position parallel to the optimal focal plane of the condensing means 40. Further, the control over the position in the direction Z brings the imaging surface 31 a into coincidence with the optimal focal position of the condensing means 40.

Figure 6:
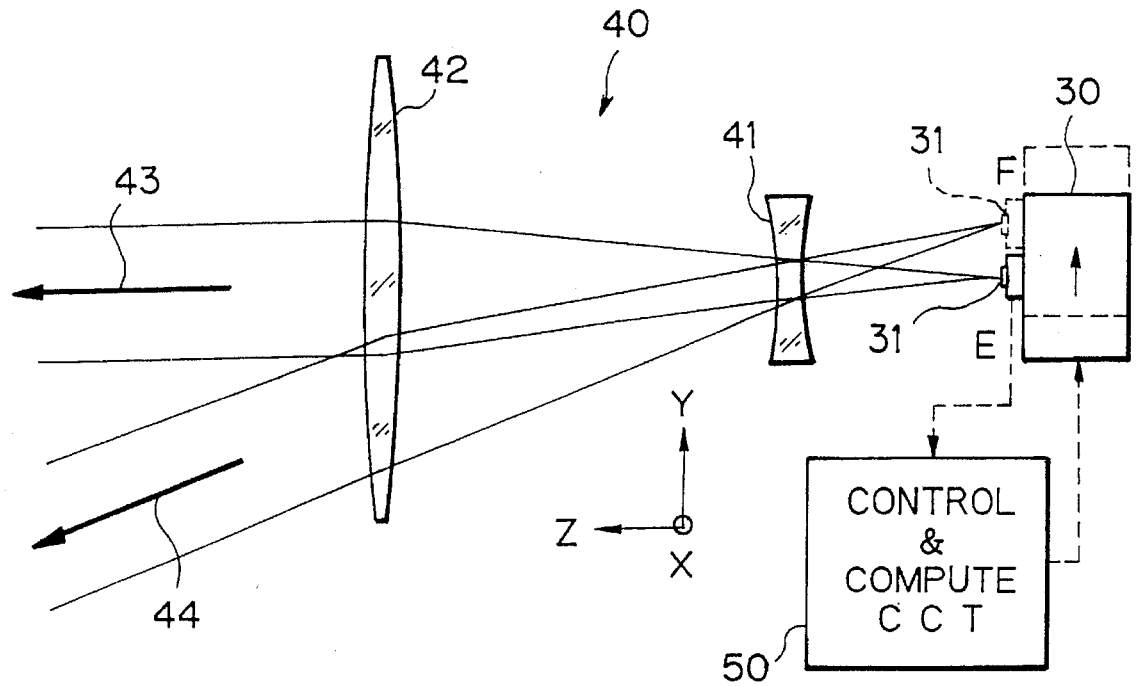
FIG. 6 is a view demonstrating how an optical axis is adjusted by the multifreedom adjustment of the imaging device.
Figure 7:
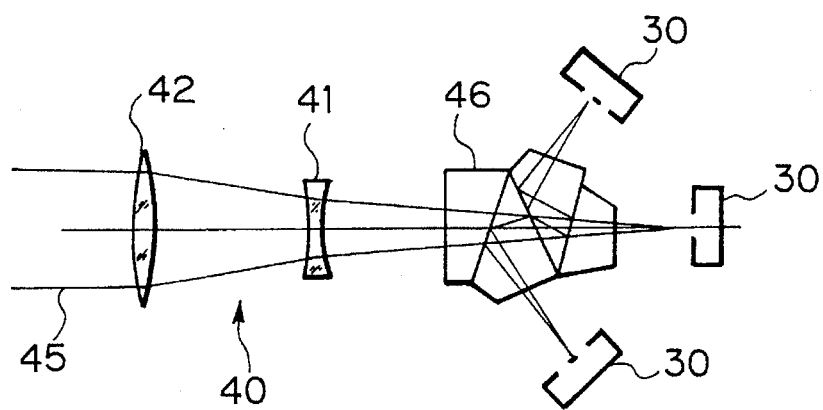
FIG. 7 is a view of multiband optics implemented with the embodiment of the present invention.

FIG. 6 demonstrates how the optical axis is adjusted by the multifreedom adjustment of the imaging device 31. FIG. 7 shows multiband optics implemented with the illustrative embodiment.

Specifically, as shown in FIG. 6, when the imaging device 31 is located at a position E lying in the optical focal plane of the condensing means 40, the orientation of the device 31 is coincident with an optical axis 43. As the imaging device 31 is moved from the position E to a position F also lying in the focal plane, the orientation changes about the X axis, as represented by an optical axis 44. Likewise, when the imaging device 31 is moved in the direction X, the orientation changes about the Y axis.

In the optics shown in FIG. 7, an optical path 45 is separated into multibands by spectral means 46 so as to image each band by a particular imaging device. By applying the illustrative embodiment to such multiband optics, it is possible to dynamically adjust even the deviation between bands (interband registration).

The PID control will be described in detail. A plurality of position sensors 80, FIG. 2, are each fixed in place in close proximity to particular one of the linear actuators 32a–32f, FIG. 3. Each sensor 80 measures the distance between the associated movable portion and stationary portion by real time measurement. Let the output matrix of the six sensors 80 be expressed as:

M={m1, m2, m3, m4, m5, m6}t

Also, assume that the imaging device 31 moves along and rotates about the axes, as represented by:

S={s1, s2, s3, s4, s5, s6}t

The output matrix M unconditionally corresponds to the conditions of the imaging device 31 associated with the six axes. Hence, based on the geometric positional relation between the imaging device 31 and the position sensors 80, there holds the following relation represented by a 6×6 transform matrix Ks:

S=M.Ks

The difference between the state S of the imaging device 31 and the target value determined by the computing circuit 53, FIG. 2, is the target control value matrix as measured from the current time, as follows:

L={l1, l2, l3, l4, l5, l6}t

The relation between the matrix L and the amount of actuation to be executed is produced by:

L.Kc where Kc is a 6×6 transform matrix defining the positions of the liner actuators 32a–32f and imaging device 31.

PID control is generally expressed as:

$$F(s) = K\left(1 + \frac{1}{Ti \cdot s} + Td \cdot s\right)$$

where Td and Ti are a differentiation constant and an integration constant, respectively. By such PID control, the value L.Kc is constantly fed back to feed corresponding power to each linear actuator. Of course, various compensation factors regarding the control may be added, as needed.

As stated above, the system 20 controls the imaging device 31 with respect to six different axes. This is successful in bringing the imaging device 31 into registration with the optimal focal position despite the focus displacement ascribable to temperature, misalignment ascribable to the production line, change in the focal position due to fine displacements of various sections ascribable to launching. In addition, even the deviation of orientation relative to a target due to disturbance is cancelled.

In summary, it will be seen that the present invention provides a disturbance compensation system capable of correcting, on a spacecraft, focus displacements of condensing means, the fine displacements of an imaging device, and interband registration of multiband optics. Moreover, the compensation system of the present invention is miniature.

Various modifications will become possible for those skilled in the art after receiving the teachings of the present disclosure without departing from the scope thereof.

What is claimed is:

1. A disturbance compensation system for a camera on board a spacecraft and having an imaging device and condensing means for condensing light onto said imaging device, said system comprising:

position adjusting means for adjusting a position of the imaging device by moving said imaging device with multifreedom; and control means for computing, in response to position information associated with the imaging device, an amount in which the position of said imaging device should be corrected, and controlling said position adjusting means on the basis of said amount;

wherein said position adjusting means comprises a plurality of non-contact type linear actuator means.

2. A system as claimed in claim 1, wherein said plurality of non-contact type linear actuator means each comprises a voice coil motor.

3. A system as claimed in claim 4, wherein said plurality of non-contact type linear actuator means each comprises a moving magnet.

\* \* \* \* \*